(12) United States Patent
Nagasawa et al.

(10) Patent No.: US 9,719,576 B2
(45) Date of Patent: Aug. 1, 2017

(54) VIBRATION ISOLATOR

(71) Applicant: BRIDGESTONE CORPORATION, Tokyo (JP)

(72) Inventors: Masakazu Nagasawa, Yokohama (JP); Akira Ueki, Kamakura (JP); Shuhei Ono, Yokohama (JP); Yasuyuki Nagashima, Yokohama (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 14/820,867

(22) Filed: Aug. 7, 2015

(65) Prior Publication Data

US 2016/0053846 A1 Feb. 25, 2016

(30) Foreign Application Priority Data

Aug. 20, 2014 (JP) ................................. 2014-167275

(51) Int. Cl.
*F16F 13/10* (2006.01)
*B60K 5/12* (2006.01)
*F16F 13/08* (2006.01)

(52) U.S. Cl.
CPC .......... *F16F 13/107* (2013.01); *B60K 5/1208* (2013.01); *F16F 13/08* (2013.01)

(58) Field of Classification Search
CPC ...... F16F 13/105; F16F 13/106; F16F 13/107; F16F 13/08; F16F 13/10; B60K 5/1208
(Continued)

(56) References Cited

U.S. PATENT DOCUMENTS 4,700,931 A 10/1987 Eberhard et al.
4,742,999 A 5/1988 Flower
(Continued)

FOREIGN PATENT DOCUMENTS

GB EP 0262544 A2 * 4/1988 ............. F16F 13/10
JP 58072740 A * 4/1983
(Continued)

OTHER PUBLICATIONS

International Search Report dated Sep. 8, 2015 from the International Bureau in corresponding International Application No. PCT/JP2015/070644.
(Continued)

*Primary Examiner* — Thomas J Williams
(74) *Attorney, Agent, or Firm* — Sughrue Mion, PLLC (57) ABSTRACT

A vibration isolator includes a partition member (15) that partitions a liquid chamber (16) in a first mounting member (11) into a primary liquid chamber (16a) using an elastic body (13) as a part of a wall surface thereof and a secondary liquid chamber (16b), and a movable member (23) housed in a housing chamber (20) provided within the partition member (15), the movable member being free to be deformed or displaced in an axial direction of the first mounting member (11). The partition member (15) is provided with a plurality of communicating holes (22) that extend from a portion of the partition member (15) which is exposed to the primary or secondary liquid chamber (16a or 16b) toward the inside of the partition member and are open toward the movable member (23). The partition member (15) is equipped with partition plate parts (18 and 19) of which front and back surfaces are directed in the axial direction of the first mounting member, the partition plate parts dividing the housing chamber (20) from the primary and dividing the housing chamber from secondary liquid chamber (16a or
(Continued)

16b). The communicating holes (22) include communicating pores (24) which pass through the partition plate parts (18 and 19), and each of which has an inner diameter of 3.6 mm or less.

8 Claims, 8 Drawing Sheets

(58) Field of Classification Search
USPC .................. 267/140.13, 140.14, 140.15
See application file for complete search history.

(56) References Cited

U.S. PATENT DOCUMENTS

| | | | |
|---|---|---|---|
| 4,762,309 A | 8/1988 | Hutchins | |
| 4,915,365 A | 4/1990 | Lee | |
| 5,020,782 A * | 6/1991 | Freudenberg | F16F 13/106 180/312 |
| 5,240,233 A | 8/1993 | Kato et al. | |
| 5,443,245 A | 8/1995 | Bellamy et al. | |
| 6,357,730 B1 * | 3/2002 | Gugsch | F16F 13/106 267/140.15 |
| 6,631,893 B2 | 10/2003 | Hermann et al. | |
| 7,258,331 B2 * | 8/2007 | Schneider | F16F 13/105 267/140.13 |
| 7,802,777 B2 * | 9/2010 | Katayama | F16F 13/106 267/140.13 |
| 8,998,187 B2 * | 4/2015 | Bradshaw | F16F 13/262 267/140.14 |
| 2002/0043748 A1 * | 4/2002 | Meyer | F16F 13/106 267/140.11 |
| 2005/0206056 A1 * | 9/2005 | Maeno | F16F 13/106 267/140.13 |
| 2006/0001204 A1 | 1/2006 | Kato et al. | |
| 2006/0071381 A1 * | 4/2006 | Hatakeyama | F16F 13/106 267/140.13 |
| 2007/0138718 A1 | 6/2007 | Muraoka | |
| 2008/0290573 A1 | 11/2008 | Katayama et al. | |
| 2009/0283945 A1 | 11/2009 | Kojima et al. | |
| 2010/0102495 A1 | 4/2010 | Okumura et al. | |
| 2016/0053844 A1 * | 2/2016 | Nagasawa | F16F 13/08 267/140.13 |
| 2016/0053845 A1 * | 2/2016 | Ueki | B60K 5/1208 267/140.13 |

FOREIGN PATENT DOCUMENTS

| | | |
|---|---|---|
| JP | 60-24957 U | 2/1985 |
| JP | 61-2938 A | 1/1986 |
| JP | 2006-17134 A | 1/2006 |
| JP | 2008-291869 A | 12/2008 |
| JP | 2009-002478 A | 1/2009 |
| JP | 2013-210093 A | 10/2013 |

OTHER PUBLICATIONS

Office Action dated Jun. 1, 2016 from the United States Patent and Trademark Office in corresponding U.S. Appl. No. 14/824,616.
International Search Report dated Aug. 25, 2015 issued in counterpart application No. PCT/JP2015/070426.

* cited by examiner

VIBRATION ISOLATOR

BACKGROUND OF THE INVENTION

Field of the Invention

The present invention relates to a vibration isolator that is applied to, for instance, a motor vehicle or an industrial machine to absorb and attenuate vibrations of a vibration generator such as an engine.

Priority is claimed on Japanese Patent Application No. 2014-167275, filed Aug. 20, 2014, the content of which is incorporated herein by reference.

Description of Related Art

For example, a vibration isolator described in Japanese Unexamined Patent Application, First Publication No. 2009-2478 is known. The vibration isolator is equipped with a tubular first mounting member that is connected to one of a vibration generator and a vibration absorber, a second mounting member that is connected to the other, an elastic body that connects the mounting members, a partition member that partitions a liquid chamber in the first mounting member within which a liquid is enclosed into a primary liquid chamber using the elastic body as a part of a wall surface thereof and a secondary liquid chamber, and a movable member that is housed in a housing chamber provided in the partition member to be deformable or displaceable in an axial direction of the first mounting member. The partition member is provided with a plurality of communicating holes that extend inward in the axial direction from a portion of the partition member which is exposed to the primary liquid chamber or the secondary liquid chamber and that are open toward the movable member.

SUMMARY OF THE INVENTION

Incidentally, in the conventional vibration isolator, when vibration is input and a liquid circulates through the communicating holes, if resonance occurs in the communicating holes, the movable member is greatly deformed or displaced in the housing chamber in the axial direction, and resonance magnification is increased. A vibration-proof characteristic of the vibration isolator may be deteriorated.

In order to inhibit such a vibration-proof characteristic from being deteriorated, employing narrowing an axial interval between the movable member and a wall surface of the housing chamber and regulating axial deformation or displacement of the movable member in the housing chamber may be considered. However, in this case, high-precision dimension management is required, and many design restrictions occur. In addition, when a large amplitude of vibration is input, abnormal noises may occur, for instance, because the movable member collides with the wall surface of the housing chamber, and the vibration-proof characteristic of the vibration isolator may be deteriorated.

The present invention has been made in consideration of the aforementioned circumstances and an object of the present invention is to improve a vibration-proof characteristic of a vibration isolator regardless of amplitude or a frequency of input vibration while increasing the degree of freedom of design.

To solve the above problems, the present invention proposes the following means.

A vibration isolator according to the present invention includes: a first mounting member a tubular shape and connected to one of a vibration generator and a vibration absorber, and a second mounting member connected to the other; an elastic body configured to connect the mounting members to each other of the vibration generator and the vibration absorber; a partition member disposed within the first mounting member and configured to partition a liquid chamber within which a liquid is enclosed into a primary liquid chamber using the elastic body as a part of a wall surface thereof and a secondary liquid chamber; and a movable member housed in a housing chamber provided within the partition member, the movable member being free to be deformed or displaced in an axial direction of the first mounting member. The partition member is provided with a plurality of communicating holes that extend from a portion of the partition member which is exposed to the primary liquid chamber or the secondary liquid chamber toward an inside of the partition member and are open toward the movable member. The partition member is equipped with partition plate parts of which front and back surfaces are directed in the axial direction of the first mounting member, the partition plate parts dividing the housing chamber from the primary liquid chamber and dividing the housing chamber from the secondary liquid chamber. The communicating holes include communicating pores that pass through the partition plate parts. Each of the communicating pores has an inner diameter of 3.6 mm or less, wherein the inner diameter is a shortest transverse distance of the communicating pore on a straight line perpendicular to the axial direction of the first mounting member.

In this case, since the minimum inner diameter of each communicating pore is equal to or less than 3.6 mm, it is possible to sufficiently weaken a force of a liquid circulating through the communicating pores and to reduce an influence which the liquid exerts on the movable member. Accordingly, resonance magnification of resonance caused by the communicating holes can be reduced without narrowing the axial interval between the movable member and a wall surface of the housing chamber. Thereby, a vibration-proof characteristic of the vibration isolator can be improved regardless of amplitude or a frequency of input vibration while increasing the degree of freedom of design.

When the minimum inner diameter of each communicating pore is more than 3.6 mm, the force of the liquid circulating through the communicating pores cannot be sufficiently weakened, and the resonance magnification of the resonance caused by the communicating holes may not be reduced.

The communicating pores may be formed in a tapered shape extending in the axial direction, so as to have a maximum and a minimum inner diameter, wherein the minimum inner diameter is 3.6 mm or less.

The communicating pores may be reduced in diameter toward the inside of the partition member in the axial direction.

The communicating holes further comprise large-diameter communicating holes which pass through the partition plate parts in the axial direction of the first mounting member and wherein a minimum inner diameter of the large-diameter communicating holes is greater than a diameter of the communicating pores. The communicating pores may be disposed at portions of the partition plate parts radially inside of the large-diameter communicating holes.

DETAILED DESCRIPTION OF THE INVENTION (First Embodiment)

Next, a vibration isolator of a first embodiment according to the present invention will be described with reference to FIGS. 1 and 2.

Figure 1:
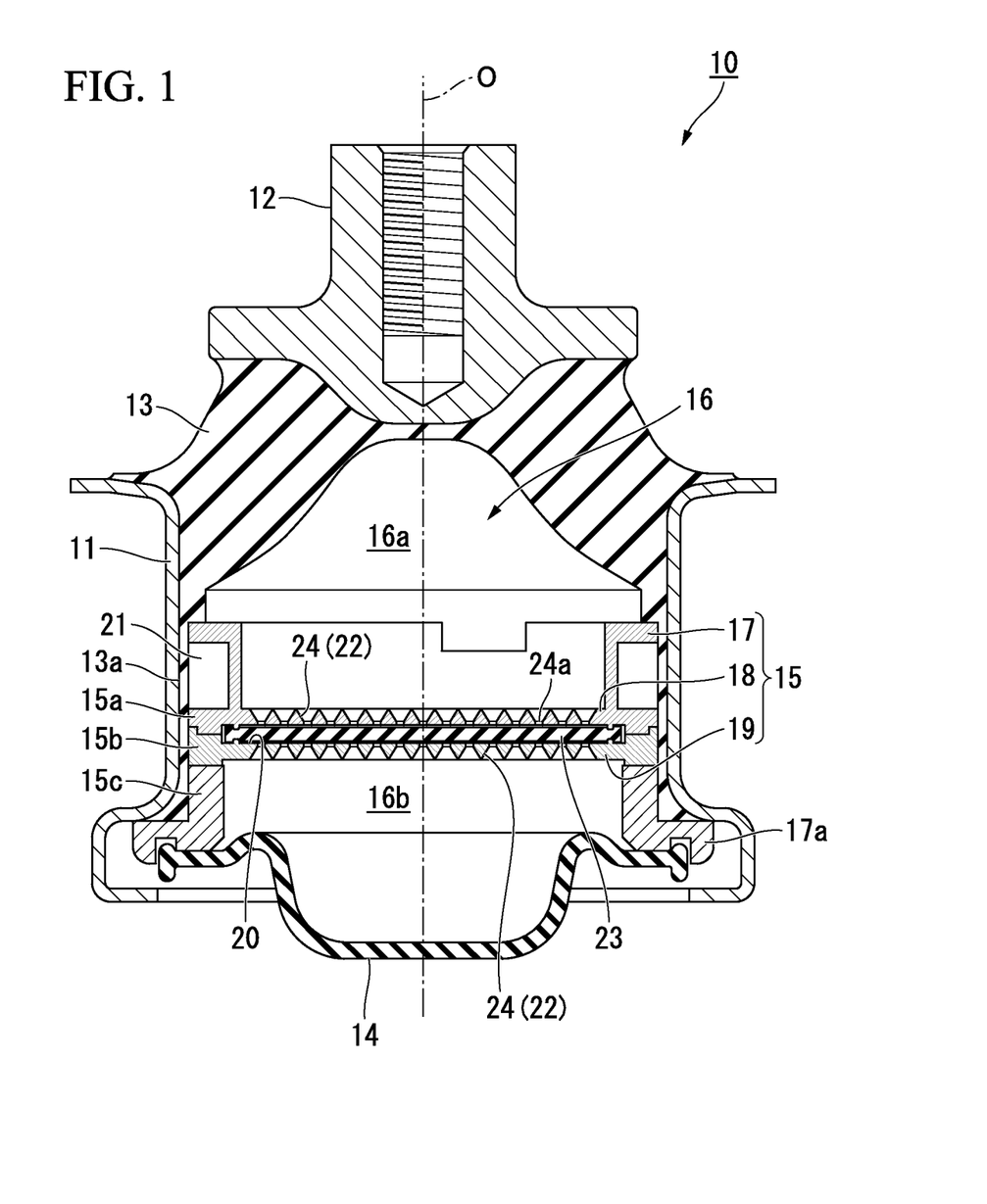
FIG. 1 is a longitudinal sectional view of a vibration isolator according to a first embodiment of the present invention.

As shown in FIG. 1, the vibration isolator 10 is equipped with a tubular first mounting member 11 that is connected to one of a vibration generator and a vibration absorber, a second mounting member 12 that is connected to the other, an elastic body 13 that elastically connects the first mounting member 11 and the second mounting member 12, and a partition member 15 that is disposed inside the first mounting member 11 and partitions a liquid chamber 16 formed inside the first mounting member 11 into a primary liquid chamber 16a and a secondary liquid chamber 16b.

Each of these members is provided coaxially with a central axis O. Hereinafter, a direction along the central axis O is referred to as an axial direction (axial direction of the first mounting member), a direction perpendicular to the central axis O is referred to as a radial direction (radial direction of the first mounting member), and a direction around the central axis O is referred to as a circumferential direction (circumferential direction of the first mounting member).

Here, the aforementioned liquid chamber 16 is partitioned into the primary liquid chamber 16a that uses the elastic body 13 as a part of a wall surface thereof and is located at one side (upper side in FIG. 1) in the axial direction, and the secondary liquid chamber 16b that is located at the other side (lower side in FIG. 1) in the axial direction by the partition member 15.

The primary liquid chamber 16a and the secondary liquid chamber 16b are enclosed with a liquid such as ethylene glycol, water, or silicone oil.

The vibration isolator 10 is mounted on, for instance, a motor vehicle, and inhibits vibration of an engine from being transmitted to a vehicle body. In the vibration isolator 10, the second mounting member 12 is connected to the engine (not shown) acting as the vibration generator, whereas the first mounting member 11 is connected to the vehicle body acting as the vibration absorber via a bracket (not shown).

The second mounting member 12 is disposed at one side in the axial direction relative to the first mounting member 11.

The elastic body 13 is vulcanized and adhered to an inner circumferential surface of an end of the first mounting member 11, the end of which is located at the one side in the axial direction. The end of the first mounting member 11 which is located at the one side in the axial direction is blocked in a liquid-tight state by the elastic body 13.

The elastic body 13 is a member formed of, for instance, a resin material such as rubber. The elastic body 13 is directed to the one side in the axial direction so as to get away the one side of the first mounting member 11, and is formed in a truncated cone shape in which it is reduced in diameter toward the one side of the first mounting member 11 in the axial direction.

In the shown example, the elastic body 13 is integrally formed with a cover part 13a that covers an entire inner circumferential surface of the first mounting member 11. The cover part 13a extends from the elastic body 13 toward the other side of the first mounting member 11 in the axial direction along the inner circumferential surface of the first mounting member 11, and is vulcanized and adhered to the inner circumferential surface of the first mounting member 11.

Figure 2:
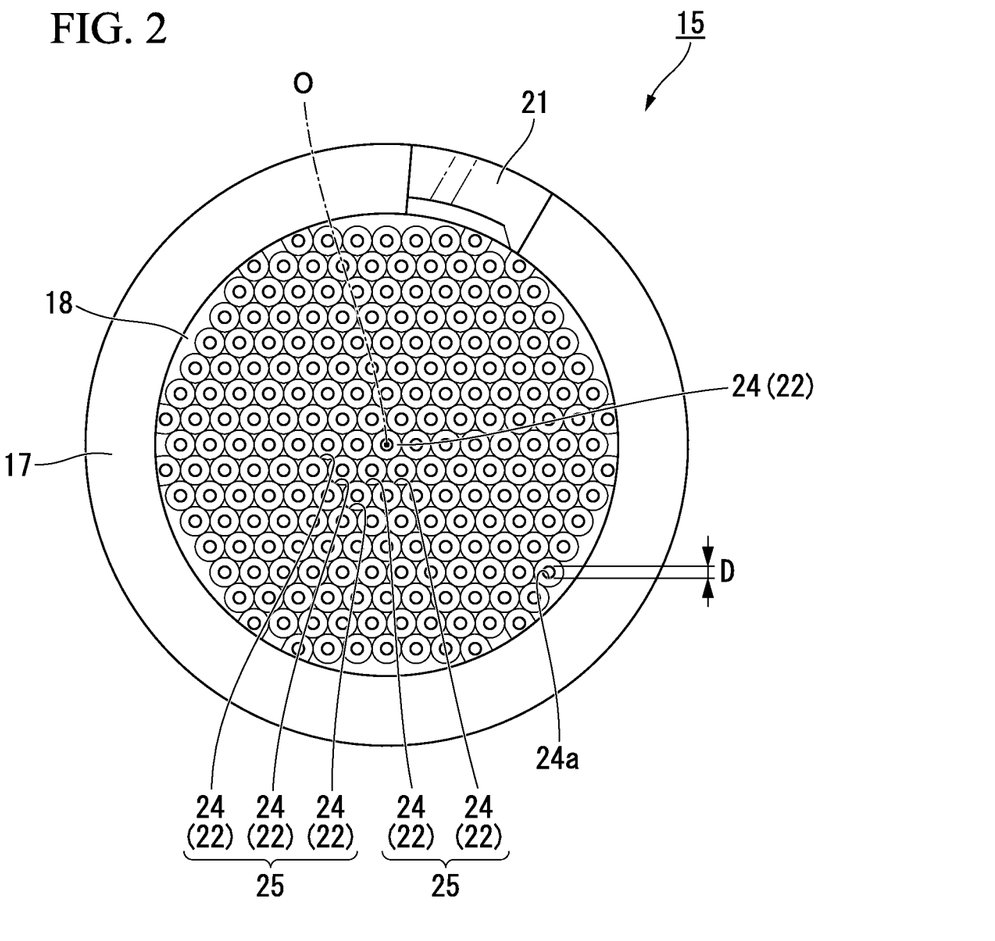
FIG. 2 is a top view of a partition member constituting the vibration isolator shown in FIG. 1.

As shown in FIGS. 1 and 2, the partition member 15 is integrally formed of, for example, an aluminum alloy or a resin. The partition member 15 is equipped with a mounting tube part 17 and partition plate parts 18 and 19.

The mounting tube part 17 is mounted in the first mounting member 11. The mounting tube part 17 is disposed coaxially with the central axis O, and is fitted into a portion located at the other side in the axial direction relative to a portion to which the elastic body 13 is vulcanized and adhered at the first mounting member 11. The mounting tube part 17 is fitted into the first mounting member 11 via the cover part 13a in a liquid-tight state.

An end of the mounting tube part 17 which is located at the other side in the axial direction is blocked in a liquid-tight state by a diaphragm 14. The diaphragm 14 is fixed to the mounting tube part 17 from the other side in the axial direction. The mounting tube part 17 is provided with a flange 17a protruding outward in the radial direction, and the diaphragm 14 is fixed to the flange 17a in a liquid-tight state. Thereby, a liquid is configured to be enclosable within the liquid chamber 16 that is inside the first mounting member 11 and is located between the elastic body 13 and the diaphragm 14.

The partition plate parts 18 and 19 block an interior of the mounting tube part 17, thereby forming a housing chamber 20 in the mounting tube part 17. Front and back surfaces of the partition plate parts 18 and 19 are directed in the axial direction, and the partition plate parts 18 and 19 are disposed coaxially with the central axis O. The partition plate parts 18 and 19 are formed in a flat plate shape extending in a direction perpendicular to the central axis O. Thicknesses of the partition plate parts 18 and 19 which are sizes taken in the axial direction of the partition plate parts 18 and 19 are each, for instance, 5 mm or less, and preferably 2 mm to 5 mm.

The partition plate parts 18 and 19 are provided in a pair at an interval in the axial direction, and the housing chamber 20 is formed between these partition plate parts 18 and 19. The partition plate parts 18 and 19 include a first partition plate part 18 that divides the housing chamber 20 and the primary liquid chamber 16a in the axial direction and a second partition plate part 19 that divides the housing chamber 20 and the secondary liquid chamber 16b in the axial direction. Both of these partition plate parts 18 and 19 are formed in the same shape and size as each other.

The partition member 15 is split into a plurality of split bodies 15a, 15b, and 15c in the axial direction.

In the shown example, the partition member 15 is split into the plurality of split bodies 15a, 15b, and 15c to split the housing chamber 20 in the axial direction. The split bodies 15a, 15b, and 15c include a first split body 15a having the first partition plate part 18, a second split body 15b having the second partition plate part 19, and a third split body 15c having the flange 17a.

The partition member 15 is provided with the housing chamber 20, the restriction passage 21, and the communicating holes 22.

The housing chamber 20 is formed in a disc shape in which it extends in the direction perpendicular to the central axis O, and is disposed coaxially with the central axis O. An outer diameter of the housing chamber 20 is greater than those of both of the partition plate parts 18 and 19.

A size of the housing chamber 20 taken in the axial direction is uniform regardless of a position of the housing chamber 20 in the radial direction.

A movable member (a movable plate or a membrane) 23 is disposed in the housing chamber 20. The movable member 23 is housed in the housing chamber 20 to be deformable in the axial direction. The movable member 23 is formed of, for instance, a resin material such as rubber in a plate shape of which front and back surfaces are directed in the axial direction, and is configured to be elastically deformable. The movable member 23 is axially deformed according to a pressure difference between the primary liquid chamber 16a and the secondary liquid chamber 16b. The movable member 23 is formed in a flat plate shape in which it extends in the direction perpendicular to the central axis O. An outer circumferential edge of the movable member 23 is fixed to the partition member 15 in the axial direction. A gap is provided in the axial direction between a portion of the movable member 23 which is located inside relative to the outer circumferential edge thereof and a wall surface of the housing chamber 20.

The restriction passage 21 communicates the primary liquid chamber 16a and the secondary liquid chamber 16b with each other. The restriction passage 21 extends along an outer circumferential surface of the partition member 15 in the circumferential direction, and is disposed to avoid the housing chamber 20. The restriction passage 21 is tuned such that, when engine shake vibration with a frequency of, for instance, about 10 Hz is input, resonance (liquid column resonance) is generated.

The communicating holes 22 extend from a portion of the partition member 15 which is exposed to the primary liquid chamber 16a or the secondary liquid chamber 16b toward the inside (side of the housing chamber) in the axial direction, and are open toward the movable member 23. The plurality of communicating holes 22 are provided for each of the first partition plate part 18 and the second partition plate part 19. In the present embodiment, all the communicating holes 22 serve as communicating pores 24 formed in the same shape and size as one another.

The communicating pores 24 pass through the partition plate parts 18 and 19 in the axial direction, and directly connect the primary liquid chamber 16a or the secondary liquid chamber 16b and the housing chamber 20. The communicating pores 24 have a circular shape from a top view in which that partition member 15 is viewed in the axial direction, and are shaped of a perfect circle from the top view. The communicating pores 24 are formed in a tapered shape extending in the axial direction. The communicating pores 24 are reduced in diameter toward the inside of the partition member in the axial direction. The ends of the communicating pores 24 which are located inside in the axial direction are formed with equidiametrical portions 24a at which inner diameters of the communicating pores 24 are uniform regardless of the position in the axial direction.

A minimum inner diameter portion at each communicating pore 24 becomes a small-diameter opening (equidiametrical portion 24a) of both end openings of each communicating pore 24. For example, as in the present embodiment, when the communicating pore 24 is formed in a tapered shape, an inner diameter of the small-diameter opening becomes a minimum inner diameter D, and the minimum inner diameter D becomes 3.6 mm or less. Also, when the communicating pore 24 is not formed in a circular shape, a shortest transverse distance of the communicating pore 24 on a straight line perpendicular to the central axis O is defined as the minimum inner diameter D of the communicating pore 24.

As shown in FIG. 2, the communicating pores 24 are disposed to be tangent externally to each other throughout the partition plate parts 18 and 19. The communicating pores 24 are disposed over the entire circumference in the circumferential direction, thereby constituting annular pore arrays 25 formed coaxially with the central axis O. Each pore array 25 forms a regular hexagon having six sides from a top view. The plurality of pore arrays 25 are provided and have different diameters from one another. The plurality of pore arrays 25 have similar shapes to one another.

The number of the communicating pores 24 constituting one side in one pore array 25 is one more than that of the communicating pores 24 constituting one side in another pore array 25 adjacent to the one pore array 25 from the inside in the radial direction. In the pore arrays 25 adjacent to each other in the radial direction, the communicating pores 24 sharing sides are disposed to alternate with each other in the circumferential direction.

One communicating pore 24 disposed coaxially with the central axis O is provided inside the pore array 25 whose diameter is smallest among the plurality of pore arrays 25.

The plurality of communicating pores 24 are disposed at each of the first and second partition plate parts 18 and 19 to form the pore arrays 25 having the same shape and size as one another. In the pore arrays 25 whose diameters are equal to each other at the respective first and second partition plate parts 18 and 19, positions of the communicating pores 24 in the circumferential direction are the same.

Next, an operation of the vibration isolator 10 configured in this way will be described.

When vibration (for example, idle vibration at a frequency of about 30 Hz) having minute amplitude (for example, ±0.2 mm or less) is applied to the vibration isolator 10 and a pressure of a liquid in the primary liquid chamber 16a is changed, the movable member 23 is deformed in the housing chamber 20 in the axial direction. Thereby, the vibration can be absorbed and attenuated.

Also, when vibration (for example, engine shake vibration at a frequency of about 10 Hz) having greater amplitude than the aforementioned minute amplitude is applied to the vibration isolator 10 and the pressure of the liquid in the primary liquid chamber 16a is changed, the movable member 23 comes into contact with the wall surface of the housing chamber 20 at the partition member 15 and blocks the communicating holes 22. At this time, the liquid circulates through the restriction passage 21 between the primary liquid chamber 16a and the secondary liquid chamber 16b, and liquid column resonance occurs. Thereby, the vibration can be absorbed and attenuated.

As described above, in the vibration isolator 10 according to the present embodiment, the minimum inner diameter of the communicating pore 24 is equal to or less than 3.6 mm. Accordingly, it is possible to sufficiently weaken a force of the liquid circulating through the communicating pores 24 and to reduce an influence which the liquid exerts on the movable member 23. Further, resonance magnification of the resonance caused by the communicating holes 22 can be reduced without narrowing the axial interval between the movable member 23 and the wall surface of the housing chamber 20. In addition, as in the present embodiment, when the thicknesses of the partition plate parts 18 and 19 are sufficiently thin, for example when the thicknesses of the partition plate parts 18 and 19 are equal to or less than 5 mm, the resonance magnification of the resonance caused by the communicating holes 22 can be effectively reduced. Thereby, the vibration-proof characteristic of the vibration isolator 10 can be improved regardless of the amplitude or the frequency of the input vibration while increasing a degree of freedom of design.

When the minimum inner diameter of the communicating pore 24 is more than 3.6 mm, the force of the liquid circulating through the communicating pores 24 cannot be sufficiently weakened, and the resonance magnification of the resonance caused by the communicating holes 22 may not be reduced.

Also, since the communicating pores 24 are formed in the tapered shape extending in the axial direction, it is possible to reduce an orifice effect of the communicating pores 24 and to reliably inhibit the force of the liquid circulating through the communicating pores 24 from being increased, for example, compared to when the communicating pores 24 are formed with the same diameter throughout the length.

Further, since the communicating pores 24 are reduced in diameter toward the inside in the axial direction, the liquid flowing into the communicating pores 24 from the primary liquid chamber 16a or the secondary liquid chamber 16b can be formed, for instance, in a vortex shape on the inner circumferential surfaces of the communicating pores 24. Thereby, the force of the liquid circulating through the communicating pores 24 can be effectively weakened.

(Second Embodiment)

Next, a vibration isolator of a second embodiment according to the present invention will be described with reference to FIGS. 3 and 4.

In the second embodiment, the same parts as the components in the first embodiment are given the same symbols, and a description thereof will be omitted. Only differences will be described.

Figure 3:
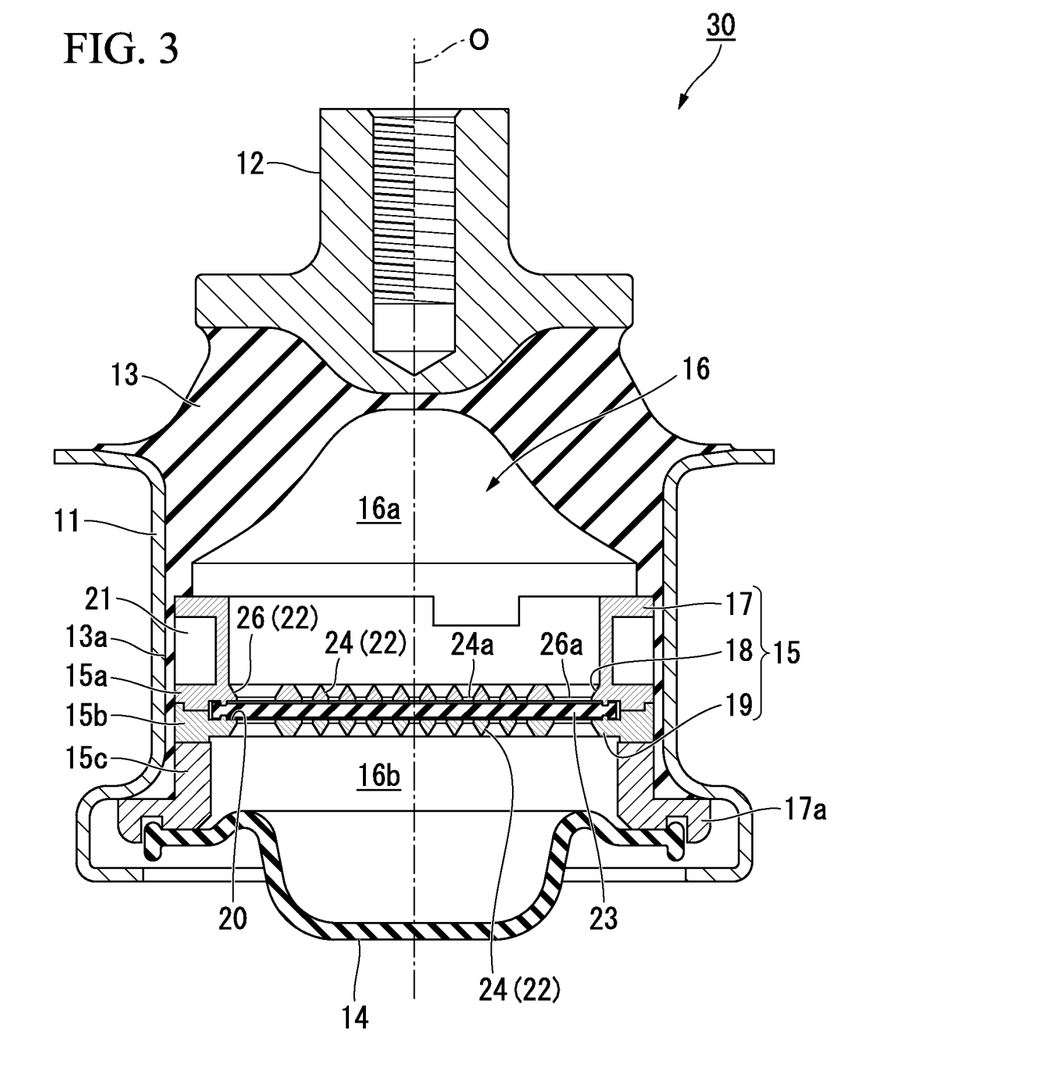
FIG. 3 is a longitudinal sectional view of a vibration isolator according to a second embodiment of the present invention.
Figure 4:
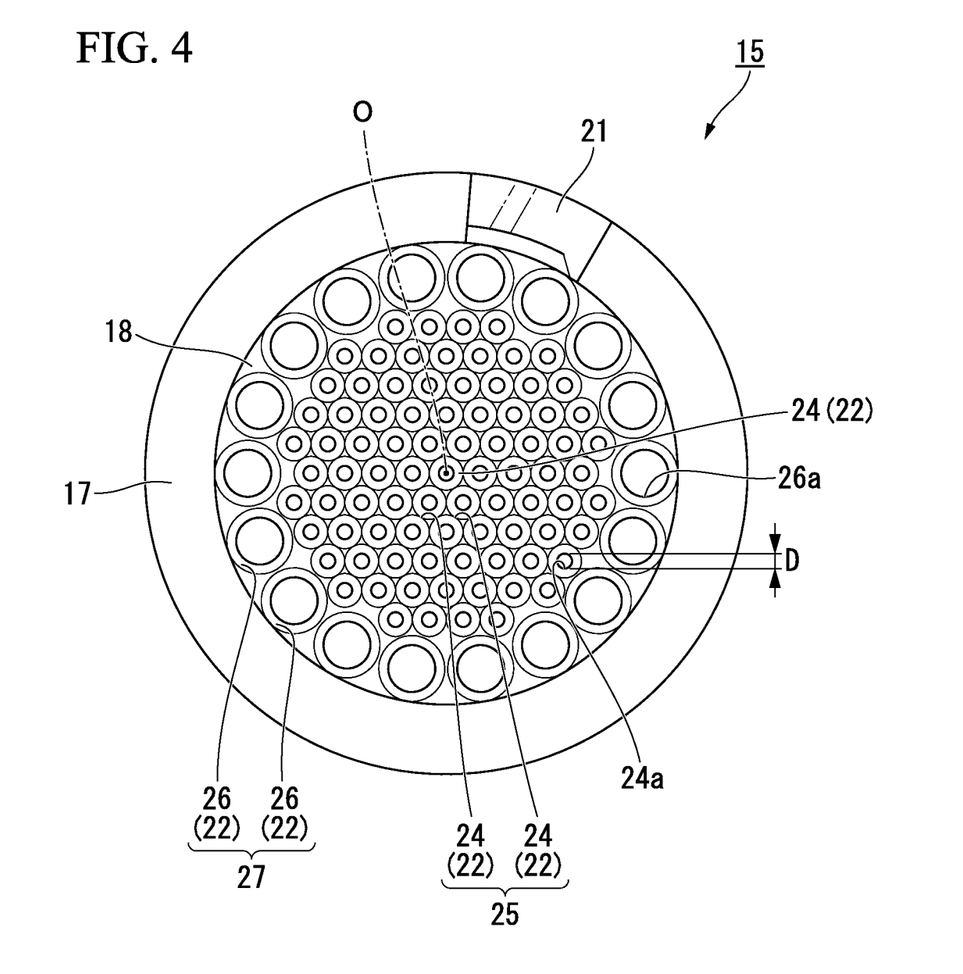
FIG. 4 is a top view of a partition member constituting the vibration isolator shown in FIG. 3.

As shown in FIGS. 3 and 4, in the vibration isolator 30 according to the present embodiment, communicating holes 22 include communicating pores 24 as well as large-diameter communicating holes 26. The plurality of large-diameter communicating holes 26 are provided in each of the first partition plate part 18 and the second partition plate part 19.

The large-diameter communicating holes 26 pass through the partition plate parts 18 and 19 in an axial direction. The large-diameter communicating holes 26 have a circular shape from a top view in which a partition member 15 is viewed in the axial direction, and a shape of each large-diameter communicating hole 26 when viewed from above is a perfect circle. The large-diameter communicating holes 26 are formed in a tapered shape extending in the axial direction. The large-diameter communicating holes 26 are reduced in diameter from the outside (opposite side of the housing chamber) toward the inside in the axial direction. An end of each large-diameter communicating hole 26 which is located inside in the axial direction is formed with an equidiametrical portion 26a whose inner diameter is uniform regardless of the position in the axial direction.

A minimum inner diameter of each large-diameter communicating hole 26 is greater than a minimum inner diameter D of each communicating pore 24. In the present embodiment, a minimum inner diameter portion at the large-diameter communicating hole 26 becomes a small-diameter opening (equidiametrical portion 26a) of both end openings of the large-diameter communicating hole 26, and an inner diameter of the small-diameter opening is greater than the minimum inner diameter D of the communicating pore 24.

The plurality of large-diameter communicating holes 26 are disposed at outer circumferential edges of the partition plate parts 18 and 19 throughout the circumference. The large-diameter communicating holes 26 are disposed throughout the circumference in the circumferential direction, thereby constituting an annular large-diameter hole array 27 formed coaxially with the central axis O. The large-diameter hole array 27 has a circular shape from a top view. The large-diameter hole array 27 is provided exclusively in one array at the respective first and second partition plate parts 18 and 19.

The plurality of large-diameter communicating holes 26 are disposed in each of the first and second partition plate parts 18 and 19 to form the large-diameter hole array 27, the large-diameter communicating holes 26 have the same shape and size. In the large-diameter hole arrays 27 at the respective first and second partition plate parts 18 and 19, the positions of the large-diameter communicating holes 26 in the circumferential direction are equal.

The communicating pores 24 are disposed at portions of the partition plate parts 18 and 19 which are located relatively inside to the large-diameter communicating holes 26 (large-diameter hole array 27). In the present embodiment, in each of the partition plate parts 18 and 19, the sum of opening areas of the plurality of communicating pores 24 occupies 10% or more of the sum of opening areas of all of the communicating holes 22 that include the communicating pores 24 and the large-diameter communicating holes 26.

As described above, in the vibration isolator 30 according to the present embodiment, since the communicating pores 24 are disposed at the portions of the partition plate parts 18 and 19 which are located relatively inside to the large-diameter communicating holes 26, the communicating pores 24 can face a midportion of the movable member 23 which is a portion that is easily deformable in the axial direction. Accordingly, as the large-diameter communicating holes 26 are formed, a remarkable effect of sufficiently weakening a force of a liquid circulating through the communicating pores 24 can be accomplished while securing the opening areas of all of the communicating holes 22, and resonance magnification of resonance caused by the communicating holes 22 can be effectively reduced.

The technical scope of the present invention is not limited to the above embodiments, and may be variously modified without departing from the spirit of the present invention.

For example, in the above embodiments, the restriction passage 21 is provided, but the restriction passage 21 may not be present.

In the above embodiments, the communicating pores 24 are reduced in diameter toward the inside of the partition member in the axial direction, but the present invention is not limited thereto. For example, the communicating pores 24 may be increased in diameter toward the inside of the partition member in the axial direction.

Further, the communicating pores 24 may not be formed in the tapered shape extending in the axial direction. For example, each communicating pore 24 is formed with the same diameter through the length in the axial direction, and the minimum inner diameter D and the maximum inner diameter of the communicating pore 24 may match the inner diameter of the communicating pore 24. In this case, if the inner diameter of the communicating pore 24 is set to 3.6 mm or less, the minimum inner diameter D of the communicating pore 24 can be set to 3.6 mm or less.

As the movable member 23, a constitution different from that in the above embodiments may be employed. For example, the movable member 23 may be housed inside the housing chamber 20 to enable displacement in the axial direction, and another constitution in which the movable member 23 is housed inside the housing chamber 20 to enable deformation or displacement in the axial direction may be adequately employed.

In the aforementioned embodiments, the case in which the second mounting member 12 and the engine are connected and the first mounting member 11 and the vehicle body are connected has been described, but the present invention is not limited thereto. In contrast, the first mounting member 11 and the engine may be configured to be connected, and the second mounting member 12 and the vehicle body may be configured to be connected. The vibration isolator 10 may be installed on another vibration generator and another vibration absorber.

Although preferred embodiments of the present invention have been described, the present invention is not limited to these embodiments. Additions, omissions, substitutions, and other modifications of the constitution are possible without departing from the spirit of the present invention. The present invention is not to be considered as being limited by the foregoing description, and is only limited by the appended claims.

Next, first and second verification tests for verifying the operation and effects described above will be described.

The first verification test is a verification test for the sizes of the minimum inner diameters D of the communicating pores 24, and the second verification test is a verification test for the disposed positions of the communicating pores 24 and the large-diameter communicating holes 26.

(First Verification Test)

In the first verification test, as the vibration isolators, five vibration isolators including vibration isolators of Examples 1 to 4 and a vibration isolator of Comparative Example 5 were prepared. In these five vibration isolators, the sizes of the minimum inner diameters D of the communicating pores 24 and the numbers of the communicating pores 24 varied, and for the other constitutions, the same constitutions as the vibration isolator 10 according to the first embodiment shown in FIG. 1 were employed.

In Example 1, the minimum inner diameter D of each communicating pore 24 was set to 1.2 mm. In Example 2, the minimum inner diameter D was set to 1.7 mm. In Example 3, the minimum inner diameter D was set to 2.4 mm. In Example 4, the minimum inner diameter D was set to 3.6 mm. In Comparative Example 5, the minimum inner diameter D was set to 6 mm. Thus, in the respective vibration isolators of Examples 1 to 4 and Comparative Example 5, the numbers of the communicating pores 24 varied such that the opening areas of all of the communicating holes 22 were equal to one another.

Thus, in the first verification test, vibration was input into the vibration isolator of each of Examples 1 to 4 and Comparative Example 5, and tan δ (dimensionless number), K (N/mm), and Ki (N/mm) were measured.

Note that K is an absolute spring constant, and Ki is a loss spring constant.

Figure 5:
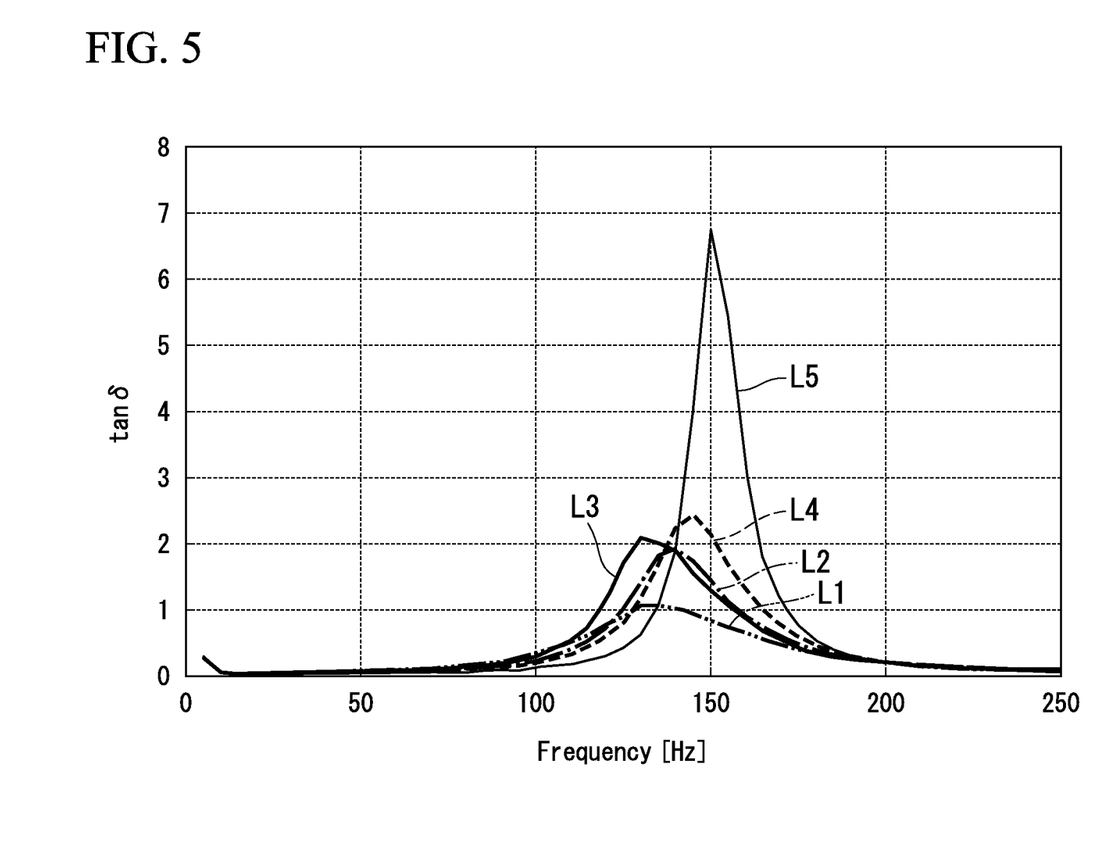
FIG. 5 is a graph showing results of a first verification test and a graph showing a relation between a frequency and tan δ.
Figure 6:
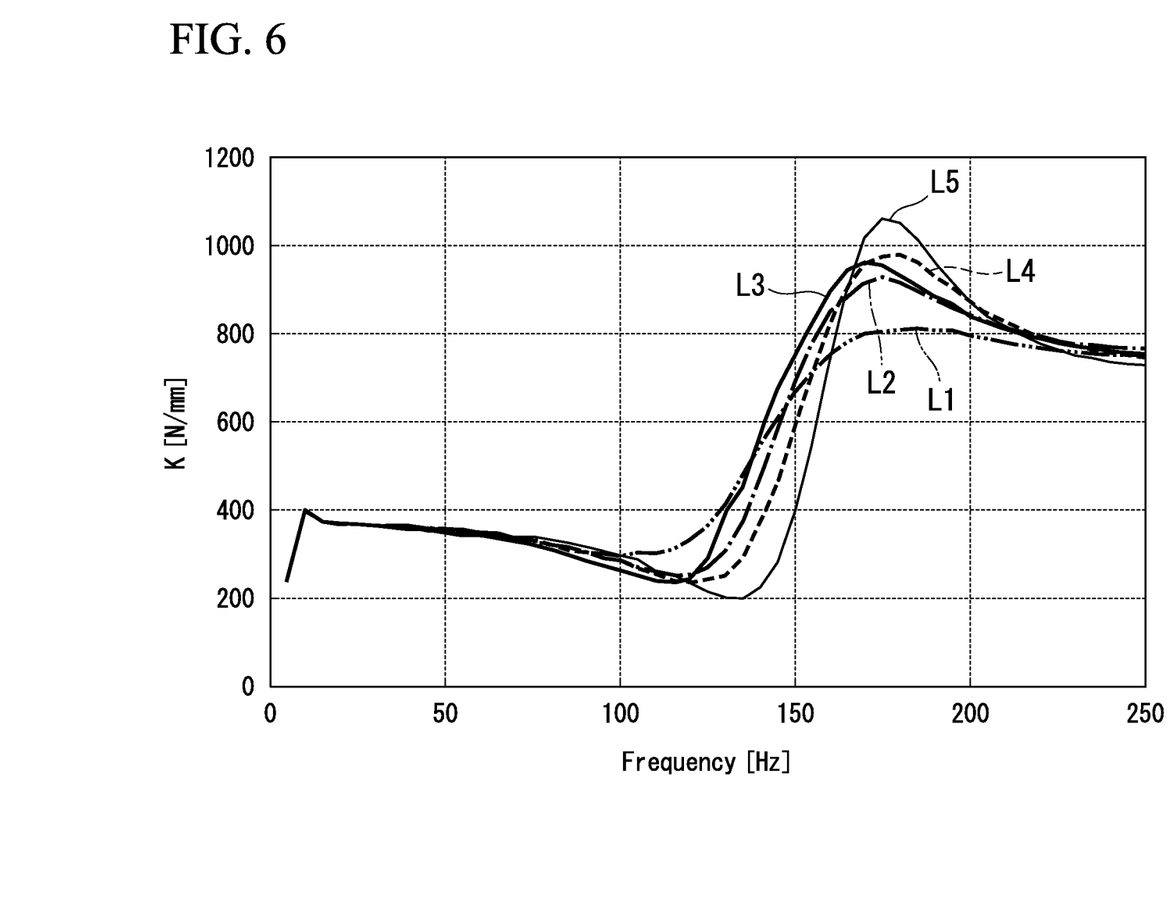
FIG. 6 is a graph showing the results of the first verification test and a graph showing a relation between a frequency and K.
Figure 7:
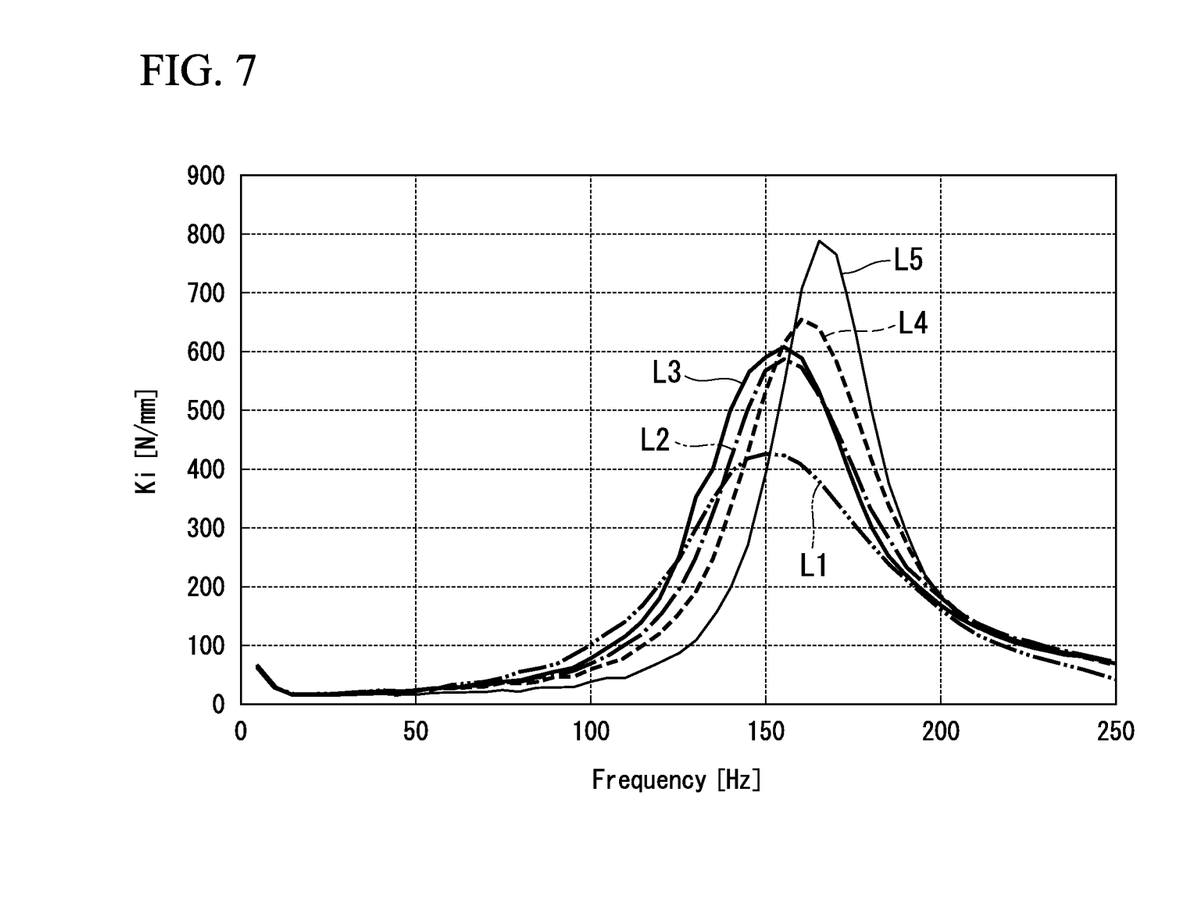
FIG. 7 is a graph showing the results of the first verification test and a graph showing a relation between a frequency and Ki.

The results are shown in the graphs of FIGS. 5 to 7. Transverse axes of the graphs represent frequency (Hz) of the input vibration, and longitudinal axes of the graphs represent tan δ in FIG. 5, K in FIG. 6, and Ki in FIG. 7. Also, in the graphs, a plurality of graph lines L1, L2, L3, L4, and L5 represent Example 1, Example 2, Example 3, Example 4, and Comparative Example 5, respectively.

It was found from these graphs that values of tan δ, K, and Ki were maximized when the frequency of the input vibration was between 100 and 200 Hz in all of the vibration isolators. Thus, it was found that the results of Examples 1 to 4 were reduced with respect to any maximized value of tan δ, K, and Ki compared to the result of Comparative Example 5.

It was found from the foregoing that when the minimum inner diameter D of the communicating pore 24 was set to 3.6 mm or less, the resonance magnification of the resonance caused by the communicating holes 22 could be reduced.

(Second Verification Test)

In the second verification test, as the vibration isolators, two vibration isolators including a vibration isolator of Example 6 and a vibration isolator of Example 7 were prepared. In this verification test, as the vibration isolator of Example 6, the vibration isolator 30 shown in FIG. 3 was employed. As the vibration isolator of Example 7, a constitution in which the positions at which the communicating pores 24 and the large-diameter communicating holes 26 were disposed in the vibration isolator of Example 6 were switched was employed. That is, in the vibration isolator of Example 7, the communicating pores 24 were disposed at the outer circumferential edges of the partition plate parts 18 and 19, and the large-diameter communicating holes 26 were disposed at the portions of the partition plate parts 18 and 19 which were located inside relative to the communicating pores 24.

Thus, in the second verification test, vibration was input into the vibration isolators of Examples 6 and 7, and K (N/mm) was measured.

Figure 8:
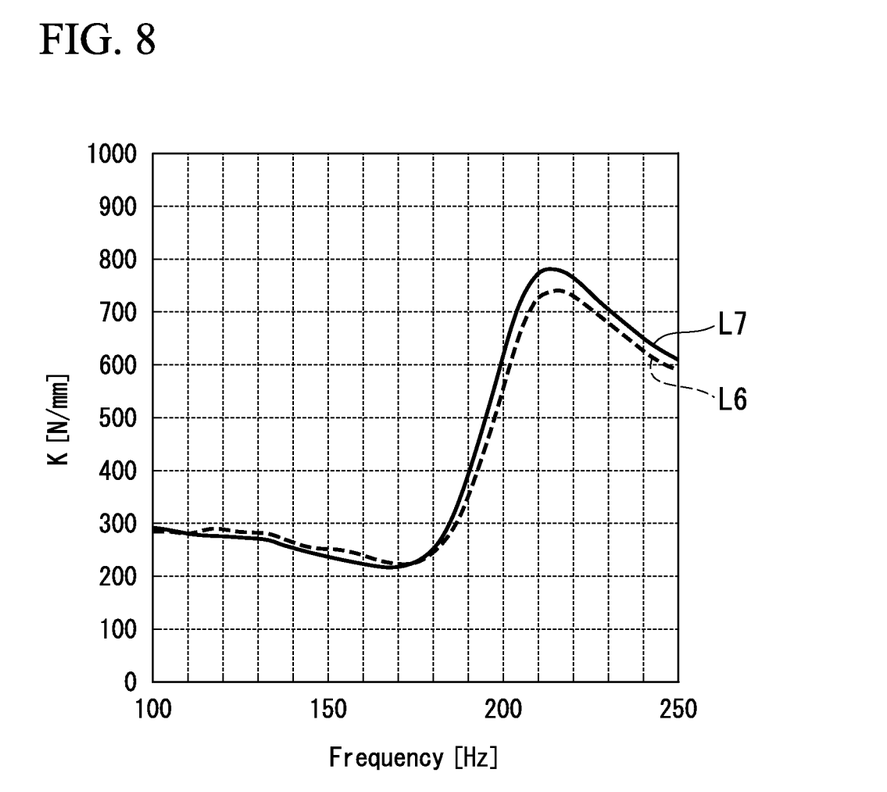
FIG. 8 is a graph showing results of a second verification test.

The results are shown in a graph of FIG. 8. A transverse axis of the graph represents frequency (Hz) of the input vibration, and a longitudinal axis of the graph represents K. Also, in the graph, a plurality of graph lines L6 and L7 represent Example 6 and Example 7, respectively.

It was found from this graph that a value of K was maximized when the frequency of the input vibration was between 200 and 250 Hz in both of the vibration isolators. Thus, it was found that the result of Example 6 was lower than that of Example 7 with respect to the maximized value of K.

It was found from the foregoing that when the communicating pores 24 were disposed relatively inside to the large-diameter communicating holes 26 in the partition plate parts 18 and 19, the resonance magnification of the resonance caused by the communicating holes 22 could be effectively reduced.

What is claimed is:
1. A vibration isolator comprising:
a first mounting member having a tubular shape and connected to one of a vibration generator and a vibration absorber, and a second mounting member connected to the other of the vibration generator and the vibration absorber;

an elastic body configured to connect the first and second mounting members;

a partition member disposed within the first mounting member and configured to partition a liquid chamber within which a liquid is enclosed into a primary liquid chamber using the elastic body as a part of a wall surface thereof and a secondary liquid chamber; and a movable member housed in a housing chamber provided within the partition member, the movable member being free to be deformed or displaced in an axial direction of the first mounting member, wherein the partition member is provided with a plurality of communicating holes that extend from a portion of the partition member which is exposed to the primary liquid chamber or the secondary liquid chamber toward an inside of the partition member and are open toward the movable member, the partition member is equipped with partition plate parts of which front and back surfaces are directed in the axial direction of the first mounting member, the partition plate parts dividing the housing chamber from the primary liquid chamber and dividing the housing chamber from the secondary liquid chamber, the communicating holes include communicating pores that pass through the partition plate parts, each of the communicating pores has an inner diameter of 3.6 mm or less wherein the inner diameter is a shortest transverse distance of the communicating pore on a straight line perpendicular to the axial direction of the first mounting member, the communicating pores are disposed to be tangent externally to each other throughout both of the partition plate parts, which are provided at both sides of the movable member in the axial direction of the first mounting member;

the communicating holes further comprise large-diameter communicating holes which pass through the partition plate parts in the axial direction of the first mounting member and wherein a minimum inner diameter of the large-diameter communicating holes is greater than a diameter of the communicating pores;

the communicating pores are disposed at portions of the partition plate parts radially inside of the large-diameter communicating holes; and wherein the large-diameter communicating holes are disposed in an annular array;

wherein the large-diameter communicating holes are disposed to be tangent externally to each other throughout the annular array.

2. The vibration isolator according to claim 1, wherein the communicating pores are formed in a tapered shape extending in the axial direction, so as to have a maximum and a minimum inner diameter, wherein the minimum inner diameter is 3.6 mm or less.

3. The vibration isolator according to claim 2, wherein the communicating pores are reduced in diameter toward the inside of the partition member in the axial direction.

4. The vibration isolator according to claim 1, wherein an outer circumferential edge of the movable member is fixed.

5. The vibration isolator according to claim 4, wherein the movable member blocks the large-diameter communicating holes and the communicating pores.

6. The vibration isolator according to claim 5, further comprising a diaphragm, wherein the primary liquid chamber is a single chamber extending from the elastic body to the movable member, and the secondary liquid chamber is a single chamber extending from the diaphragm to the movable member.

7. The vibration isolator according to claim 1, wherein the movable member blocks the large-diameter communicating holes and the communicating pores.

8. The vibration isolator according to claim 1, further comprising a diaphragm, wherein the primary liquid chamber is a single chamber extending from the elastic body to the movable member, and the secondary liquid chamber is a single chamber extending from the diaphragm to the movable member.

* * * * *